May 29, 1934.  A. O. ABBOTT, JR  1,960,427
METHOD AND APPARATUS FOR MANUFACTURING TIRES
Filed July 1, 1930   3 Sheets-Sheet 2
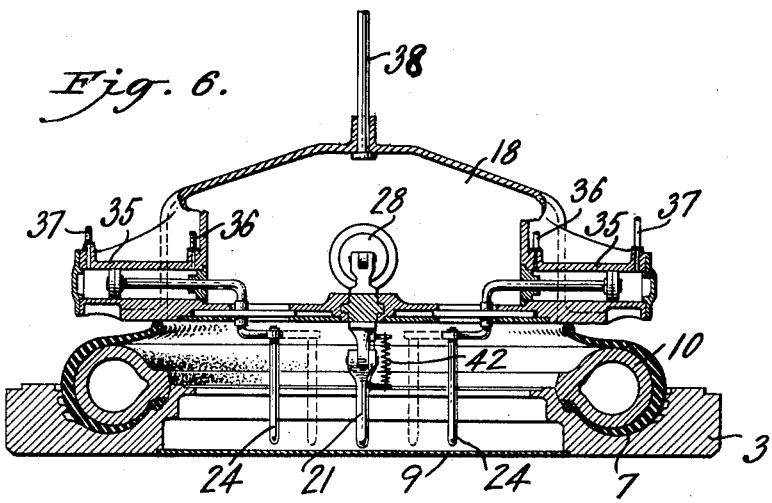
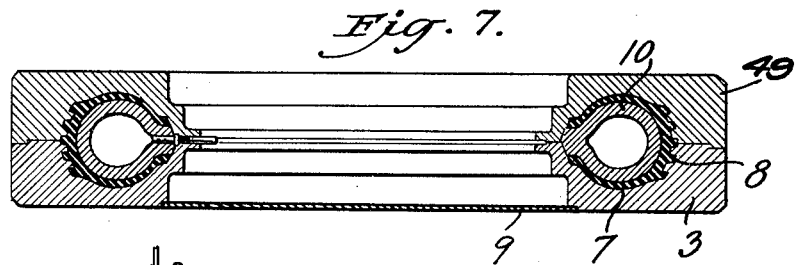
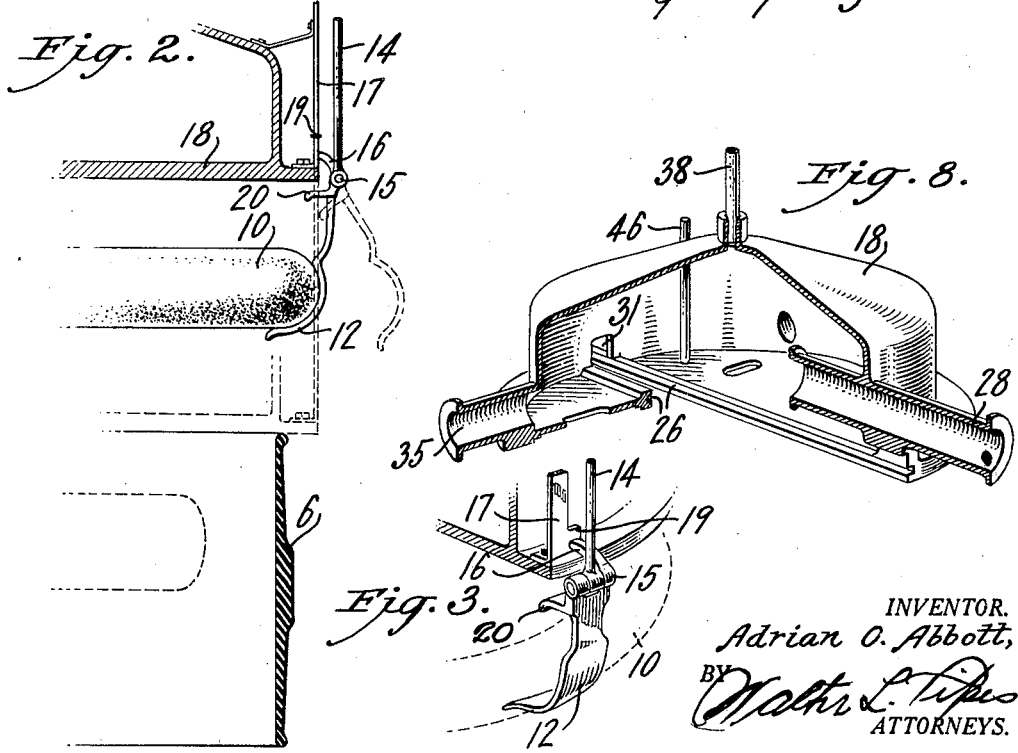
INVENTOR.
Adrian O. Abbott, Jr.
BY
ATTORNEYS.

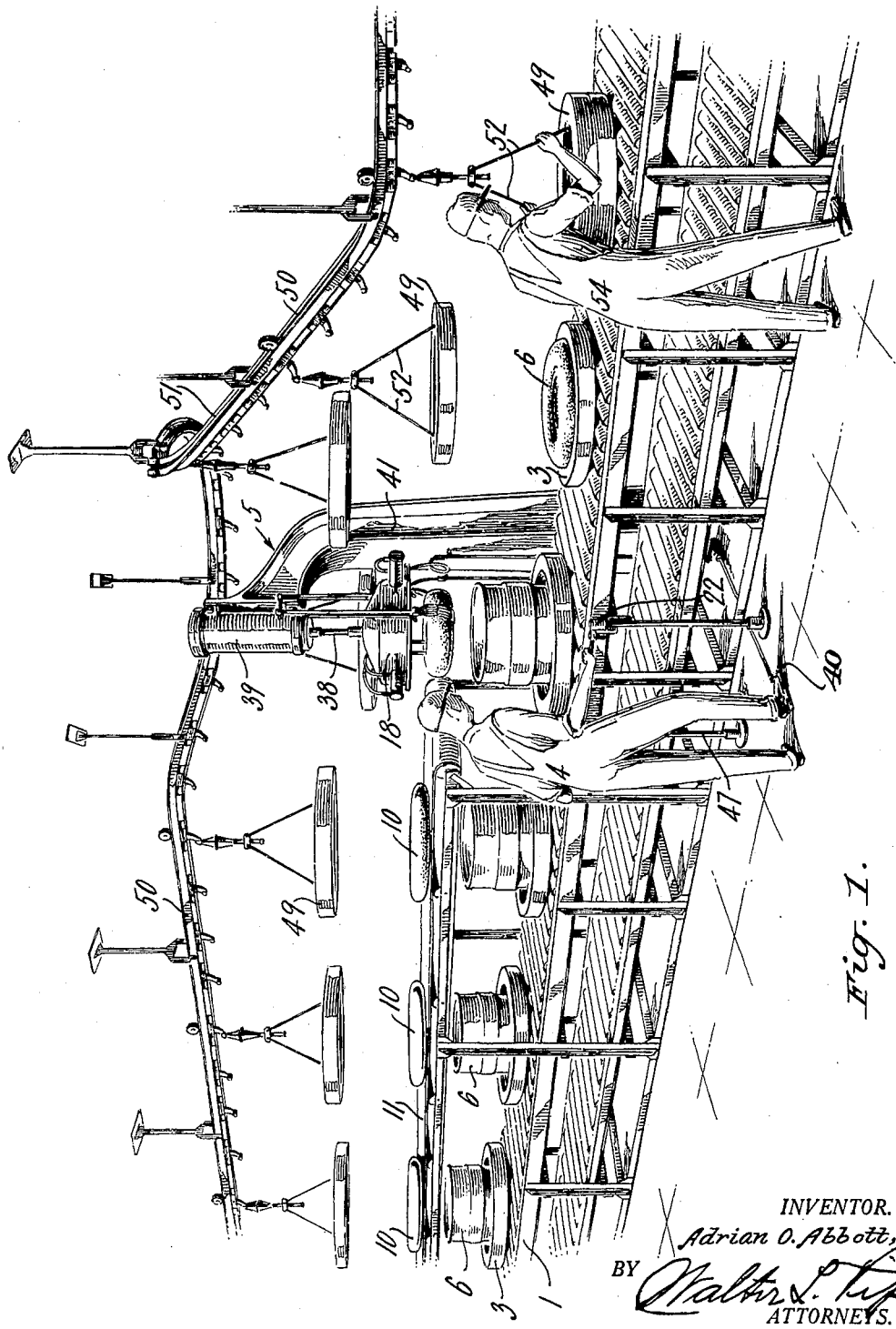

May 29, 1934.  A. O. ABBOTT, JR  1,960,427
METHOD AND APPARATUS FOR MANUFACTURING TIRES
Filed July 1, 1930  3 Sheets-Sheet 3
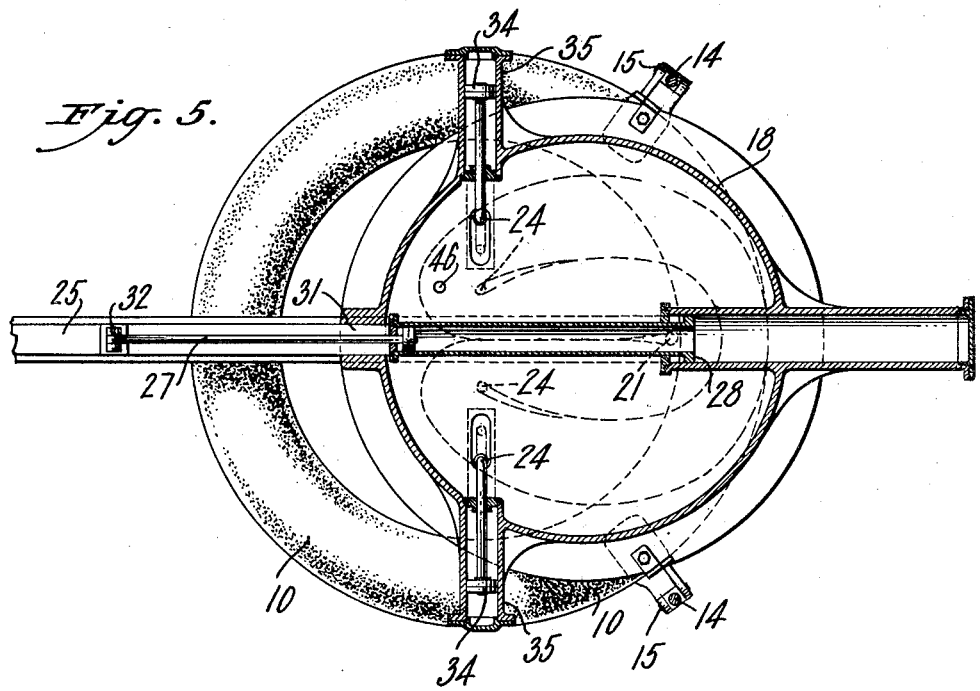
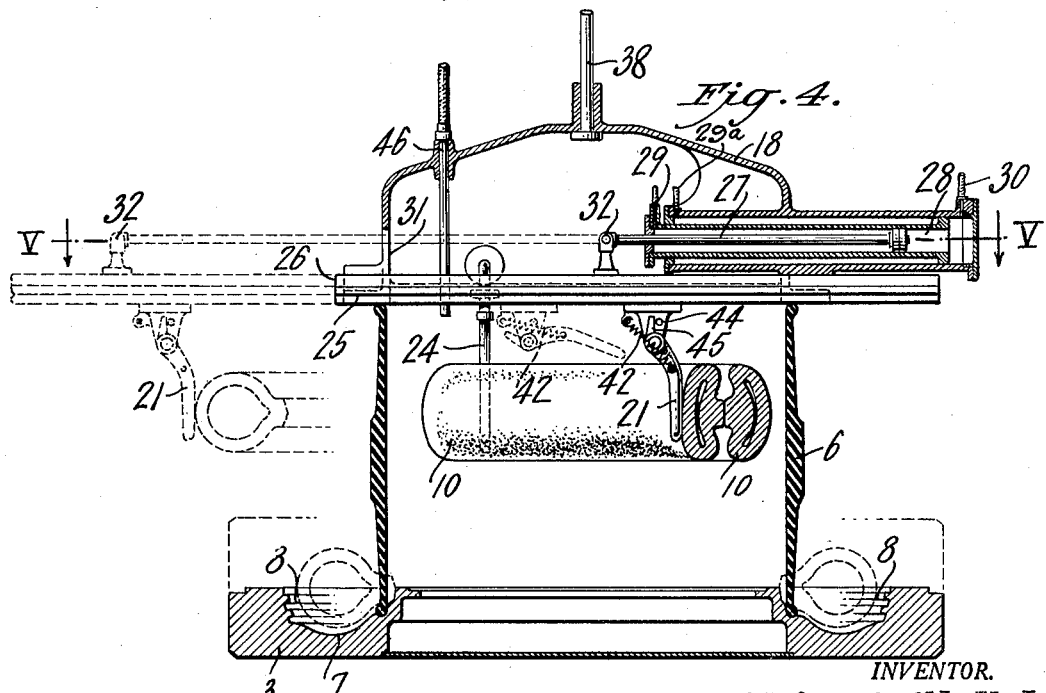
INVENTOR.
Adrian O. Abbott, Jr.
BY
ATTORNEYS.

Patented May 29, 1934

1,960,427

UNITED STATES PATENT OFFICE 1,960,427

METHOD AND APPARATUS FOR MANUFACTURING TIRES

Adrian O. Abbott, Jr., Detroit, Mich., assignor to Morgan & Wright, Detroit, Mich., a corporation of Michigan Application July 1, 1930, Serial No. 465,109

47 Claims. (Cl. 18—4)

My invention relates to methods and apparatus for manufacturing tires and more particularly to methods and apparatus for assembling curing bags within tire bands and shaping the latter around the curing bags in a tire mold.

In the manufacture of tires by the flat band or pulley band process it has heretofore been customary to shape a tire band and insert a curing bag in the shaped band at one station. The insertion of the curing bags into the tire bands has sometimes been done manually at the expenditure of considerable labor. A mechanism for inserting curing bags into the tires during the shaping operation is shown in the reissue patent to Ernest Hopkinson, No. 17,618, dated March 4, 1930. Another apparatus for confining curing bags and positioning them in the tire bands during the shaping operation is shown in application Serial No. 435,115, filed March 12, 1930, Walter L. Pipes, which is assigned to Morgan & Wright Company. Regardless of whether the curing bags have been inserted in the tire bands manually or mechanically, it has heretofore been customary to assemble them at one station.

After the tire bands and curing bags have been assembled they are transported to a vulcanizing apparatus. During the vulcanizing operation each tire is cured while being confined between its associated curing bag and the surfaces of a tire mold. During the vulcanizing operation fluid is admitted into the curing bag for forcing the tire into the impressions formed in the surfaces of the mold. Such impressions give the tread configuration to the tire and apply indicia, such as the manufacturer's name, trade mark, and the like. The assembly of each tire and curing bag in the mold has been a separate operation, usually taking place a considerable distance from the point of assembly of the tire and curing bag.

I propose to eliminate the necessity for separately transporting the assembled tire shapes and curing bags previous to their insertion in the tire molds, and also to simplify the apparatus required for shaping the tire bands, by providing a substantially continuously operating machine which assembles successive curing bags and tire bands, shapes the bands, and seats the shaped bands and curing bags in a mold section by substantially a single stage operation. Provision is made for closing each mold after a tire band has been seated in one section thereof.

In carrying out my invention, separate sources for tire bands, curing bags and mold sections are provided. Such sources are so co-ordinated that the tire bands are carried forward in mold sections. The curing bags are confined and inserted into the tire bands while the latter are being shaped. The shaped tire bands and assembled curing bags are seated in the mold sections so that complementary mold sections may be supplied for completing the vulcanizing molds without the necessity for handling the tire bands during the application of the curing bags and the placing of the bands and curing bags in the mold.

The accompanying drawings illustrate a present preferred embodiment of apparatus for practicing my invention, in which Figure 1 is a perspective view of an apparatus for placing curing bags in tire bands and shaping the bands while carried by successive mold sections;

Fig. 2 is a broken view partially in elevation and partially in section illustrating a portion of the apparatus for manipulating the curing bags;

Fig. 3 is an enlarged perspective view partially in section of means for manipulating the curing bags;

Fig. 4 is a transverse sectional view of a band shaping mechanism;

Fig. 5 is a plan view thereof taken substantially along the section line V—V of Fig. 4, showing the relative positions of the component parts as indicated by dotted lines in Fig. 4;

Fig. 6 is a transverse sectional view taken at substantially right angles to the view shown in Fig. 4 and illustrating the relative positions of the component parts at substantially the end of the tire shaping operation;

Fig. 7 is a cross sectional view of an assembled mold, tire casing and curing bag after vulcanization; and Fig. 8 is a perspective broken view of a portion of the shaping mechanism.

Referring to the drawings, the apparatus for practicing my invention comprises a source of mold sections in the form of an endless conveyor 1 having an upper run and a lower run. The conveyor 1 is preferably of the step-by-step type with enough movement at each step to bring a mold section 3 between an operator 4 and a shaping machine 5 and at the same time to withdraw the preceding mold section. It is to be understood that in this type of conveyor the movement of the conveyor may be controlled by the operator 4, or that the step-by-step movement may be automatically controlled, as desired.

As the mold sections 3 are advanced toward the shaping machine 5, a tire band 6 is placed therein. As shown in Figs. 4 and 7, the mold sections 3 are of annular form and each is provided with a groove 7 having indentations 8 for shaping the tire bands and incorporating tread and other configurations to them when the tire bands are vulcanized. In order that the mold sections 3 may be used to shape the tire bands 6 by the application of differential fluid pressure, the centers of the mold sections 3 are closed by plates 9.

Curing bags 10 are supplied to the operator 4 by a second conveyor 11 which is preferably mounted above the conveyor 1 and by the frame of the latter.

As the successive mold sections 3 and tire bands 6 are positioned opposite the shaping machine 5, the operator 4 takes a curing bag 10 from the conveyor 11 and presses its forward periphery against a pair of fingers 12 which are supported by stationary rods 14 through a pivotal connection 15, as shown in Figs. 2 and 3.

Each finger 12 is provided with a tail piece 16 which bears against a plate 17 carried by the shaping head 18 of the machine 5. A notch 19 on the plate 17 is so positioned that upon downward movement of the head 18, as hereinafter described, the fingers 16 slip over the notches 19 soon after the head 18 moves downwardly. A lug 20 on each finger 12 lies in the path of the head 18 so that upon downward movement of the head the fingers 12 are swung out of the way of the head 18 and the tire band 6, for a purpose hereinafter described.

Previous to seating the curing bag 10 in the fingers 12, a pivotally mounted and spring actuated finger 21 is extended beyond the diametrically opposite peripheral portion of the curing bag. Upon the actuation of a valve 22 by the operator 4, the finger 21 is retracted to press the curing bag 10 against the fingers 12 thereby compacting and buckling the bag. Movable depending posts 24 are disposed internally of the curing bag for co-operation with the fingers 12 and 21.

The finger 21 is carried on a slide 25 movable in guideways 26 in the lower face of the head 18. The shape of the slide 25 is such as to completely close the guideways 26 to insure that the lower face of the head 18 shall constitute an air tight area when it is brought into engagement with the upper edge of each tire band 6, as hereinafter described. The slide 25 is actuated by a piston rod 27 working in a telescopic cylinder 28 which is under the control of the valve 22 through ports 29, 29a and 30. An opening 31 is cut in the shell of the header 18 for permitting the passage of the piston rod 27 and a connecting lug 32 between the piston and the slide 25. With this construction each curing bag 10 is buckled and confined by the application of mechanical pressure as soon as the bag has been positioned by the operator thereby relieving the operator from the expenditure of any considerable amount of manual labor in confining the curing bag.

As the finger 21 is moved to the right, as viewed in Figs. 4 and 5, the curing bag 10 is buckled around the posts 24 which are initially spaced apart as shown by the full line positions in Fig. 5. However, when the finger 21 completes its movement to the right, thereby completely collapsing the curing bag between it and the fingers 12, the posts 24 are moved inwardly to their dotted line positions, as shown in Fig. 5, thereby firmly clamping the curing bag between the posts 24. The movements of the posts 24 are controlled by pistons 34 working in cylinders 35 which are under control of the operator through connections to ports 36 and 37. If desired, the valve 22 may be made a multiple unit valve for controlling both the cylinders 28 and 35.

After the curing bag 10 has been collapsed and confined on the head 18, the next operation is to lower the head into engagement with a tire band 6 for shaping the latter, and at the same time to liberate the curing bag within the tire band. For this purpose the head 18 is mounted on a piston rod 38 which extends into a cylinder 39. The operation of the cylinder 39 is controlled by a pedal 40 within reach of the operator. The cylinder 39 is supported by a frame 41 of the shaping machine 5.

As the head 18 starts its downward movement the fingers 16 pass over the notches 19 after which the lower face of the head 18 engages the lugs 20 to swing the fingers 12 out and away from the bag 10 so that the fingers 12 will not interfere with the tire band 6. During this period the curing bag is supported by the tension in the bag between the posts 24 and the finger 21.

At substantially the time the curing bag 10 is lowered to within the confines of the tire band 6 the cylinder 28 is actuated by admitting fluid through the port 30 to move the finger 21 to the left, as viewed in Figs. 4 and 5. As the curing bay is still confined between the posts 24 in their advanced positions, the curing bag tends to retain its buckled position between the posts as the finger 21 is moved to the left, although there will be some tendency for the bag to follow the finger 21. However, as soon as the finger 21 has freed itself from the outer periphery of the bag it will snap to the dotted line raised position shown in Fig. 4 by the contraction of spring 42. During the confining operation of the bag the spring 42 is resisted by the engagement of a stop 44 carried by the slide 25 with a lug 45 carried by the finger 21. After the finger 21 has been drawn to its raised position the posts 24 are separated by the admission of fluid to the cylinders 35 through the ports 36. This permits the curing bag to expand from the dotted line position shown in Fig. 5 to a position engaging the inner periphery of the tire band 6.

Further downward movement of the head 18 causes its lower surface to engage and complete a seal with the upper edge of the tire band 6. At this time fluid under pressure is admitted to the tire band through a pipe line 46 having an extension 47 under the control of the operator 4. The combined action of the expanding curing bag 10, the pressure of the fluid admitted to the tire band, and the lateral pressure of the head 18 applied to the edge of the tire band 10 causes the latter to buckle and assume the shape shown in Fig. 6. This causes the tire band to be seated in the groove 7 of the mold section 3 and to surround the curing bag 10.

The head 18 is then raised by the operator through manipulation of the control line 47, and the conveyor 1 is actuated to bring a new mold section 3 opposite the machine 5, and the previously molded section is taken away from the machine. The upward movement of the head 18 causes the notches 19 to engage the finger 16 and move the fingers 12 into position to engage another curing bag. The finger 21 is carried to its position to engage another curing bag and turned from its retracted position so that it will bear against the outer periphery of the next curing bag under the influence of the spring 42. The cycles of operation may then be repeated.

After the filled mold section 3 leaves the machine 5, a complementary mold section 49 is brought into co-operating position by a conveyor 50 so that mold sections 3 and 49 may be brought together to complete a vulcanizing mold without requiring the handling of the shaped tire band and the enclosed curing bag. The conveyor 50 is preferably provided with a downwardly sloping portion 51 to lower the mold sections 49 into substantial registry with the mold sections 3 after the latter have left the shaping machine 5. The mold sections 49 are illustrated as being suspended from the conveyor by hooks 52 which are detached by an operator 54. The completed molds are then carried away by the conveyor to a vulcanizing apparatus not shown.

Accordingly, a mold section, a tire band and a curing bag are brought together and the tire band is shaped in the mold section around the curing bag without any intermediate transportation and in substantially a continuous operation. The mold section containing the shaped tire band and curing bag is brought into position for the reception of a complementary mold section while on the same conveyor. This construction and method of operation permits the shaping of a tire band preparatory to a vulcanizing operation with a minimum of effort, transportation and operations.

While I have shown and described a present preferred method and apparatus for practicing the invention, it is to be understood that the invention may be otherwise practiced and that variations may be made in the apparatus within the spirit of the invention and the scope of the appended claims.

Having thus described my invention, what I claim and desire to protect by Letters Patent is:

1. A tire making machine comprising a conveyor for tire bands, and means for inserting a curing bag in a tire band while said band is supported by said conveyor.

2. A tire making machine comprising a conveyor for tire bands, and means adjacent said conveyor for inserting curing bags in successive tire bands traversing said conveyor.

3. A tire making machine comprising means for conveying tire bands, a source of curing bags, and means adjacent said conveying means for assembling said tire bands and curing bags and for shaping the bands while supported by the conveying means.

4. A tire making machine comprising means for conveying tire bands, and means adjacent said conveying means for supplying successive tire bands while supported by the conveying means with curing bags and shaping the bands.

5. A tire making machine comprising means for conveying tire bands, a source of curing bags, and means adjacent said conveying means for collapsing curing bags and supplying them to successive tire bands while the bands are supported by the conveying means.

6. A tire making machine comprising means for conveying tire bands, a source of curing bags, and means adjacent said conveying means for collapsing curing bags and supplying them to successive tire bands while supported by the conveying means and shaping the bands.

7. In a method of making tires the step consisting in shaping a tire band directly between a tire mold section and a shaping device while the mold section is supported by a conveyor.

8. In a method of making tires the steps consisting in supplying a tire band with a separate curing bag, and shaping the tire band directly between a mold section and a shaping device while the mold section is supported by a conveyor.

9. In a method of making tires the steps consisting in supporting a tire band on a tire mold section, moving the band and mold section to a position adjacent a shaping device, applying pressure to the band to cause it to conform to the shape of the mold section, moving the shaped band and mold section away from said device, and then applying a complementary mold section.

10. A tire making machine comprising sources for a mold section, a tire band and a curing bag, conveying means for the mold section, means for placing the curing bag internally of the tire band, and means for shaping the tire band about the curing bag in the mold section while on the conveying means.

11. A tire making machine comprising a source for an assembled tire band and mold section, a source for a curing bag, and means adjacent said sources for inserting the curing bag into the tire band and shaping the latter about the curing bag in the mold section.

12. A tire making machine comprising a source for an assembled tire band and mold section, a source for a curing bag, means for inserting the curing bag into the tire band, and means for shaping the latter about the curing bag in the mold section.

13. A tire making machine comprising a source for an assembled tire band and mold section, a source for a complementary mold section, a source for a curing bag, and means for inserting the curing bag into the tire band and shaping the latter about the bag in the mold section, whereby upon the application of the complementary mold section the shaped tire band and the bag are enclosed in a tire mold.

14. A tire making machine comprising a source for assembled tire bands and mold sections, a source for complementary mold sections, a source for curing bags, and means for inserting curing bags into successive tire bands and shaping the tire bands about the bags in the mold sections, whereby upon the application of the complementary mold sections the shaped bands and the bags are enclosed in tire molds.

15. A tire making machine comprising a source for tire bands and mold sections, a source for curing bags, means for inserting curing bags into successive tire bands and shaping the tire bands about the curing bags in the mold sections, and means for supplying complementary mold sections for enclosing the shaped tire bands and the curing bags in assembled tire molds.

16. A tire making machine comprising a conveyor for tire bands and mold sections, a conveyor for curing bags, means for inserting curing bags into successive tire bands and shaping the tire bands about the curing bags in the mold sections, and a conveyor for supplying complementary mold sections for enclosing the shaped tire bands and the bags in assembled molds.

17. A tire making machine comprising a conveyor for mold sections, and means adjacent said conveyor for fitting tire bands and curing bags into successive mold sections.

18. A tire making machine comprising a conveyor for a mold section, and means adjacent said conveyor for fitting a tire band and a curing bag into the mold section.

19. A tire making machine comprising a conveyor for a mold section, means for fitting a tire band and a curing bag into the mold section, and means for disposing a second mold section in cooperative relation to the first-named mold section and fitted tire band.

20. A tire making machine comprising a conveyor for mold sections and tire bands resting thereon, means for fitting curing bags into successive tire bands, means for shaping the tire bands into the mold sections, and means for supplying complementary mold sections.

21. In a tire shaping machine, a plurality of relatively movable fingers for initially engaging and confining a curing bag, and movable secondary fingers for assisting in the operation and for confining the curing bag upon the withdrawal of the first mentioned fingers.

22. In a tire shaping machine, relatively movable fingers for engaging substantially diametrically disposed peripheral portions of a tire bag, secondary fingers for engaging an inner peripheral portion of said bag and for retaining said bag upon the withdrawal of the first named fingers, and means for separately operating said fingers.

23. In a tire shaping machine, a plurality of fingers disposed to engage substantially diametrically opposite peripheral portions of a curing bag and to form said bag into a plurality of loops, means for actuating said fingers, secondary fingers for engaging said loops, and means for moving said secondary fingers laterally with respect to the axes of said loops for confining said bag upon the withdrawal of the first named fingers.

24. In a tire shaping machine, a movable head, a finger normally extending into the path of movement of said head for confining a curing bag, and means for co-operating with said head and finger for causing the withdrawal of said finger in advance of movement of said head.

25. A tire shaping machine comprising a head for engaging an edge of a tire band, a movable finger for engaging a curing bag within the area defined by a tire band engaging said head, and means for supporting and moving said finger relative to said head while maintaining a fluid tight surface for said head.

26. A tire shaping machine comprising a support, a depending head carried by said support, means for moving said head relative to said support, means carried by said head for collapsing a curing bag and a conveyor disposed beneath said head for supporting a tire band in position to be engaged by said head.

27. In a tire shaping machine, a resiliently mounted finger for engaging an outer periphery of a curing bag, and a plurality of secondary fingers for engaging an inner peripheral portion of said bag and confining the bag, whereby when said secondary fingers are in their operative positions said resiliently mounted finger may be moved to a retracted position under the influence of its resilient mounting.

28. In a tire shaping machine, a spring mounted finger for engaging an outer periphery of a curing bag, and a plurality of secondary fingers for engaging an inner peripheral portion of said bag and confining the bag, whereby when said secondary fingers are in their operative positions said spring mounted finger may be moved to a retracted position under the influence of its spring mounting.

29. A tire making machine comprising means for conveying tire bands, a source of curing bags, and means adjacent said conveying means for assembling said tire bands and curing bags and shaping the bands while said bands are supported by said conveying means.

30. A tire making machine comprising intermittently movable conveying means for supporting tire bands, a source of curing bags, means for assembling said tire bands and curing bags while the bands are on said conveying means and it is at rest.

31. A tire making machine comprising means for conveying tire bands, and means adjacent said conveying means for supplying successive tire bands with curing bags and shaping the bands while said bands are supported by said conveying means.

32. A tire making machine comprising intermittently movable conveying means for supporting tire bands, a source of curing bags, means for supplying successive tire bands with curing bags, and means adjacent said conveying means for shaping the bands while on said conveying means and it is at rest.

33. A tire making machine comprising means for conveying tire bands, a source of curing bags, and means adjacent said conveying means for collapsing curing bags and supplying them to successive tire bands while said bands are supported by said conveying means.

34. A tire making machine comprising means for conveying tire bands, a source of curing bags, and means adjacent said conveying means for collapsing curing bags and supplying them to successive tire bands and shaping the bands while said bands are supported by said conveying means.

35. A tire making machine comprising intermittently movable conveying means for supporting tire bands, a source of curing bags, means for collapsing curing bags and supplying them to successive tire bands, and means adjacent said conveying means for shaping the bands while on said conveying means and it is at rest.

36. A tire making machine comprising means for conveying a mold section and a tire band, means for placing a curing bag internally of the tire band, and means for shaping the tire band into the mold section and about the curing bag while said mold section is supported by said conveying means.

37. A tire making machine comprising means for conveying an assembled tire band and mold section, means for conveying a complementary mold section, said conveying means being arranged to bring the mold sections into registration with each other, and means adjacent said first conveying means for inserting a curing bag into the tire band and shaping the latter about the bag in the mold section, whereby upon the application of the complementary mold section the shaped tire band and the bag are enclosed in a tire mold.

38. A tire making machine comprising means for conveying assembled tire bands and mold sections, means for conveying complementary mold sections, said conveying means being arranged to bring the mold sections into registration with each other, and means for inserting curing bags into the tire bands and shaping the tire bands into the mold sections and about the bags while the mold sections are supported on their conveying means, whereby upon the application of the complementary mold sections the shaped bands and the bags are enclosed in tire molds.

39. A tire making machine comprising a conveyor for mold sections, and means adjacent said conveyor for fitting tire bands and curing bags into successive mold sections while said mold sections are supported by said conveyor.

40. A tire making machine comprising a conveyor for mold sections and tire bands resting thereon, means for fitting curing bags into successive tire bands, means for shaping the tire bands into the mold sections while on said conveyor, and means for supplying complementary mold sections.

41. In a method of making tires the steps consisting of supplying a mold section with a tire band, moving the mold section and tire band temporarily into registry with a shaping device, and shaping the tire band directly between the mold section and the shaping device.

42. In a method of making tires the steps consisting of supplying a mold section with a tire band, moving the mold section and tire band temporarily into registry with a shaping device, shaping the tire band directly into the mold section, and then applying a complementary mold section.

43. In a tire shaping device, a movable head, and a plurality of relatively movable devices carried thereby for engaging a curing bag at a plurality of spaced areas around the periphery thereof and confining the bag upon relative movement therebetween, said devices being so spaced and of such number that the intermediate material of the bag is sufficiently buckled and confined to prevent its escape from between said devices when in their confining positions.

44. In a tire shaping device, a movable head, and a plurality of relatively movable, pneumatically operated devices carried thereby for engaging a curing bag at a plurality of spaced areas around the periphery thereof and confining the bag upon relative movement therebetween, said devices being so spaced and of such number that the intermediate material of the bag is sufficiently buckled and confined to prevent its escape from between said devices when in their confining positions.

45. In a tire shaping machine, a movable head, and a plurality of fingers carried by said head for engaging a curing bag at a plurality of spaced areas around the periphery thereof and confining the bag upon relative movement therebetween, said fingers being so spaced and of such number that the intermediate material of the bag is sufficiently buckled and confined to prevent its escape from between said fingers when in their confining positions, and remotely disposed means for controlling the movement of said head and said fingers.

46. In a tire shaping machine, a frame, a cylinder mounted thereon, a piston movable in said cylinder and supporting a head for engaging a tire band, and means carried by said head and movable relatively thereto for engaging a curing bag at a plurality of spaced areas around the periphery thereof and confining the bag by buckling and confining it at a plurality of spaced areas such that the bag is firmly held.

47. In a tire shaping machine, a head, a plurality of cylinders carried thereby, pistons independently movable in said cylinders, and fingers actuated by said pistons for engaging a curing bag at a plurality of spaced areas around the periphery thereof and confining the bag upon relative movement therebetween, said fingers being so spaced and of such number that the intermediate material of the bag is sufficiently buckled and confined to prevent its escape from between said fingers when in their confining positions.

ADRIAN O. ABBOTT, Jr.